United States Patent
Sato et al.

(10) Patent No.: US 9,027,037 B2
(45) Date of Patent: May 5, 2015

(54) INFORMATION OUTPUT DEVICE, METHOD, AND RECORDING MEDIUM FOR OUTPUTTING NOTIFICATION INFORMATION CORRESPONDING TO A STATE OF A COMPUTER

(71) Applicant: Fujitsu Limited, Kawasaki-shi, Kanagawa (JP)

(72) Inventors: Hisashi Sato, Machida (JP); Naohiro Kawaguchi, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 91 days.

(21) Appl. No.: 13/902,268

(22) Filed: May 24, 2013

(65) Prior Publication Data
US 2014/0007137 A1    Jan. 2, 2014

(30) Foreign Application Priority Data
Jun. 29, 2012    (JP) ................ 2012-147369

(51) Int. Cl.
  G06F 13/00    (2006.01)
  G06F 13/14    (2006.01)
  G06F 11/30    (2006.01)
  G06F 11/32    (2006.01)

(52) U.S. Cl.
  CPC ............ *G06F 13/14* (2013.01); *G06F 11/3006* (2013.01); *G06F 11/3051* (2013.01); *G06F 11/3055* (2013.01); *G06F 11/3072* (2013.01); *G06F 11/324* (2013.01)

(58) Field of Classification Search
  CPC .................. G06F 9/542; H04L 29/08072
  USPC .......................... 719/318; 709/224
  See application file for complete search history.

(56) References Cited

U.S. PATENT DOCUMENTS 8,752,072 B2 *    6/2014    Goldstein et al. ............. 719/318
2007/0273693 A1 *    11/2007    Johnson ....................... 345/440
2011/0029817 A1    2/2011    Nakagawa et al.

FOREIGN PATENT DOCUMENTS

JP    7-129437    5/1995
JP    2004-164552    6/2004
JP    2011-34208    2/2011

* cited by examiner

*Primary Examiner* — Andy Ho
(74) *Attorney, Agent, or Firm* — Oblon, McClelland, Maier & Neustadt, L.L.P.

(57) ABSTRACT

An information output device includes a first processor configured to execute a process to determine a type of notification information which is outputted from a computer and which notifies a state of the computer; and a second processor configured to execute a process to create a chart, in which a first coordinate axis represents time when the notification information is outputted from the computer, a second coordinate axis represents the type of the notification information, and the notification information is drawn at a corresponding position, and output the chart.

11 Claims, 11 Drawing Sheets

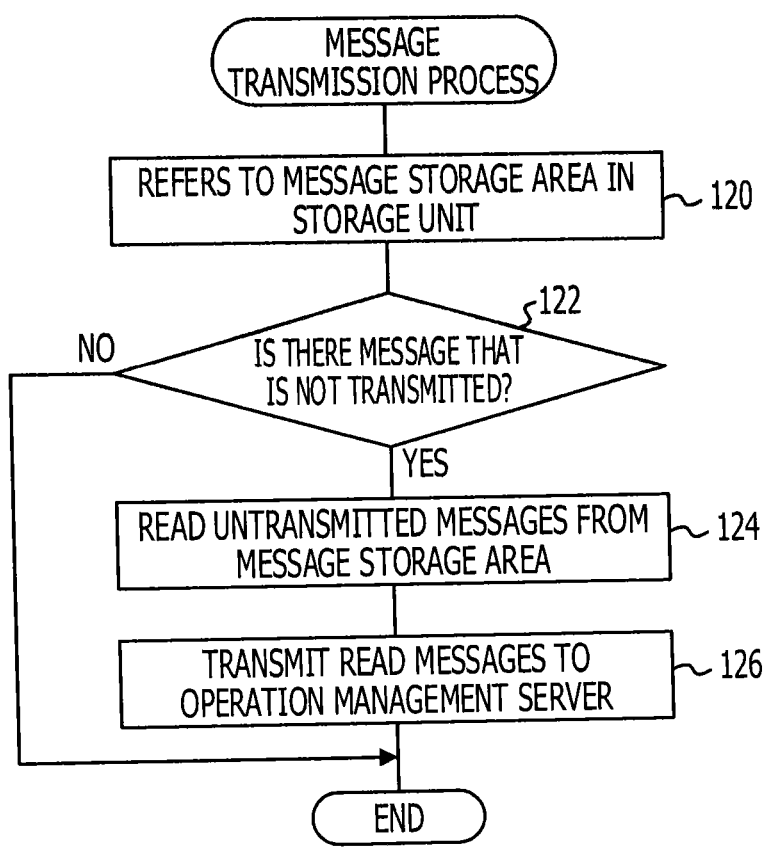

FIG. 4

| | | |
|---|---|---|
| 2011/07/15 | 23:56:34 | LOG OF WEB SERVER CHANGES TO SEQUENCE NUMBER 56 |
| 2011/07/16 | 00:00:00 | PROCESS OF JOB A SUCCESSFULLY STARTS |
| 2011/07/16 | 00:36:13 | PROCESS OF JOB A SUCCESSFULLY ENDS |
| 2011/07/16 | 00:36:14 | PROCESS OF JOB B SUCCESSFULLY STARTS |
| 2011/07/16 | 00:36:14 | PROCESS OF JOB C SUCCESSFULLY STARTS |
| 2011/07/16 | 00:48:28 | LOG OF WEB SERVER CHANGES TO SEQUENCE NUMBER 57 |
| 2011/07/16 | 00:55:51 | PROCESS OF JOB C SUCCESSFULLY ENDS |
| 2011/07/16 | 01:10:09 | PROCESS OF JOB B SUCCESSFULLY ENDS |
| 2011/07/16 | 01:10:10 | PROCESS OF JOB D SUCCESSFULLY STARTS |
| 2011/07/16 | 01:14:16 | LOG OF WEB SERVER CHANGES TO SEQUENCE NUMBER 58 |
| 2011/07/16 | 01:22:41 | PROCESS OF JOB D SUCCESSFULLY ENDS |

...

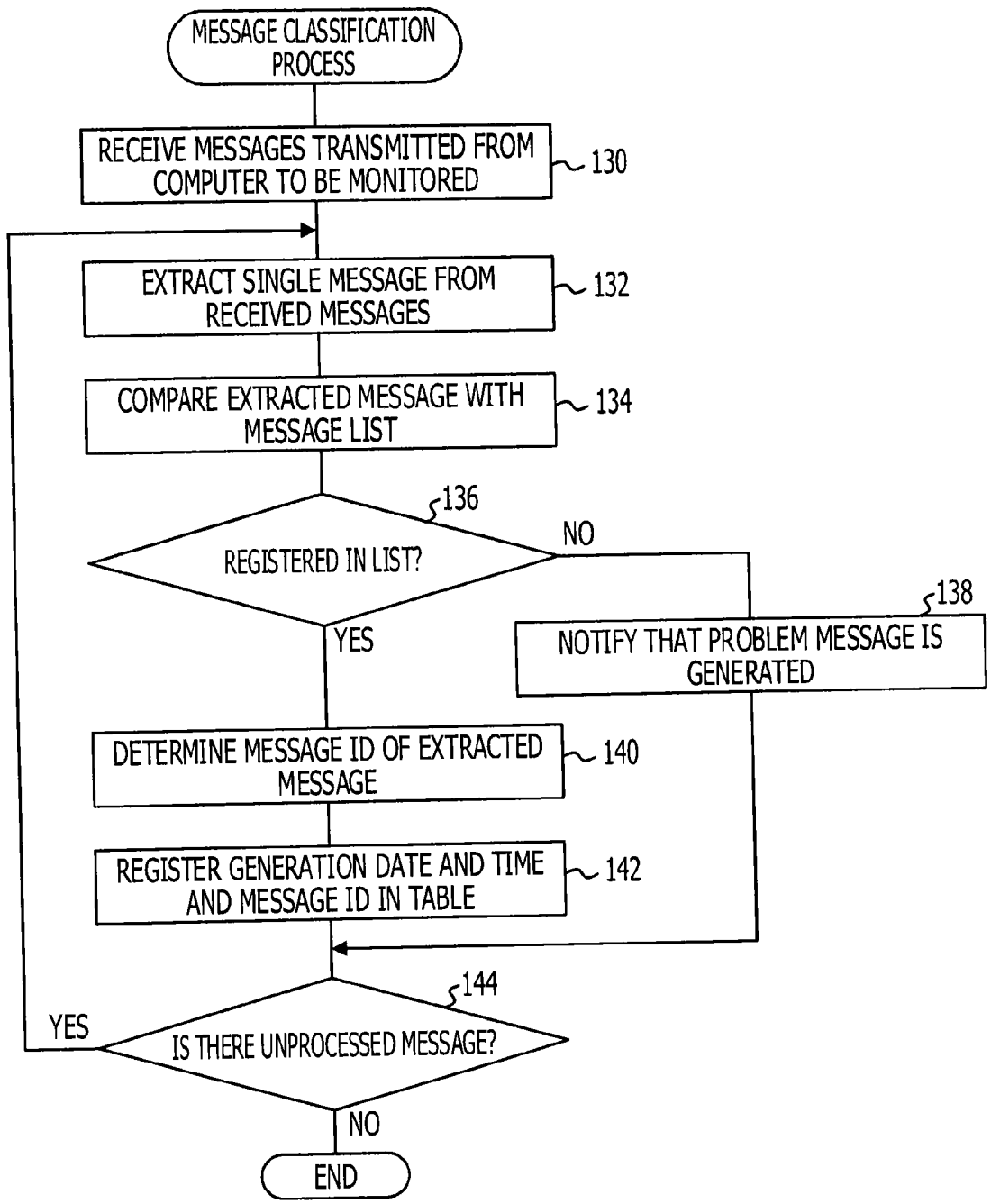

FIG. 6A

| MESSAGE ID | MESSAGE |
|---|---|
| 1 | %s LOG OF WEB SERVER CHANGES TO SEQUENCE NUMBER %s |
| 2 | %s PROCESS OF JOB A SUCCESSFULLY %s |
| 3 | %s PROCESS OF JOB B SUCCESSFULLY %s |
| 4 | %s PROCESS OF JOB C SUCCESSFULLY %s |
| 5 | %s PROCESS OF JOB D SUCCESSFULLY %s |

FIG. 6B

| GENERATION DATE AND TIME | MESSAGE ID |
|---|---|
| 2011/07/15  23:56:34 | 1 |
| 2011/07/16  00:00:00 | 2 |
| 2011/07/16  00:36:13 | 2 |
| 2011/07/16  00:36:14 | 3 |
| 2011/07/16  00:36:14 | 4 |
| 2011/07/16  00:48:28 | 1 |
| 2011/07/16  00:56:51 | 4 |
| 2011/07/16  01:10:09 | 3 |
| 2011/07/16  01:10:10 | 5 |
| 2011/07/16  01:14:16 | 1 |
| 2011/07/16  01:22:41 | 5 |
| ⋮ | ⋮ |

INFORMATION OUTPUT DEVICE, METHOD, AND RECORDING MEDIUM FOR OUTPUTTING NOTIFICATION INFORMATION CORRESPONDING TO A STATE OF A COMPUTER

CROSS-REFERENCE TO RELATED APPLICATION

This application is based upon and claims the benefit of priority from the prior Japanese Patent Application No. 2012-147369 filed on Jun. 29, 2012, the entire contents of which are incorporated herein by reference.

FIELD

The embodiment discussed herein is related to an information output device, an information output method, and a recording medium.

BACKGROUND

In operation monitoring of a computer, content of messages outputted from hardware, operating system, application, or the like of a computer to be monitored is evaluated and when a message with a problem is outputted, alarm/notification is performed.

For example, a method is disclosed in which a process type of an inputted edit command is determined, and when the determined process type indicates output of the number of messages, the number of console messages in message logging information for each message ID is outputted in a graph format.

Also, a method is disclosed in which when a plurality of data having a chronological item are displayed on a display device, the data are converted into graphics for displaying a graph and a plurality of graphs created for each converted graphic are displayed on one graph by matching time at which the data are collected to time on a time axis on the graph.

Also, a method is disclosed in which model data is created from operating information which is classified by a day of the week, a period of time, and a process state, a degree of divergence between a current operating state and a past operating state is calculated, and an abnormality is detected on the basis of the calculated divergence.

As related art, for example, Japanese Laid-open Patent Publication No. 7-129437, Japanese Laid-open Patent Publication No. 2004-164552, Japanese Laid-open Patent Publication No. 2011-34208 are disclosed.

SUMMARY

According to an aspect of the invention, an information output device includes a first processor configured to execute a process to determine a type of notification information which is outputted from a computer and which notifies a state of the computer; and a second processor configured to execute a process to create a chart, in which a first coordinate axis represents time when the notification information is outputted from the computer, a second coordinate axis represents the type of the notification information, and the notification information is drawn at a corresponding position, and output the chart.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 3 is a flowchart illustrating an example of a message transmission process executed in a computer to be monitored;

FIG. 4 is a diagram illustrating an example of messages outputted from the computer to be monitored;

FIG. 5 is a flowchart illustrating an example of a message classification process executed in an operation management server;

FIG. 6A is a diagram illustrating an example of a message list;

FIG. 6B is a diagram illustrating an example of a message sorting table;

DESCRIPTION OF EMBODIMENT

Figure 1:
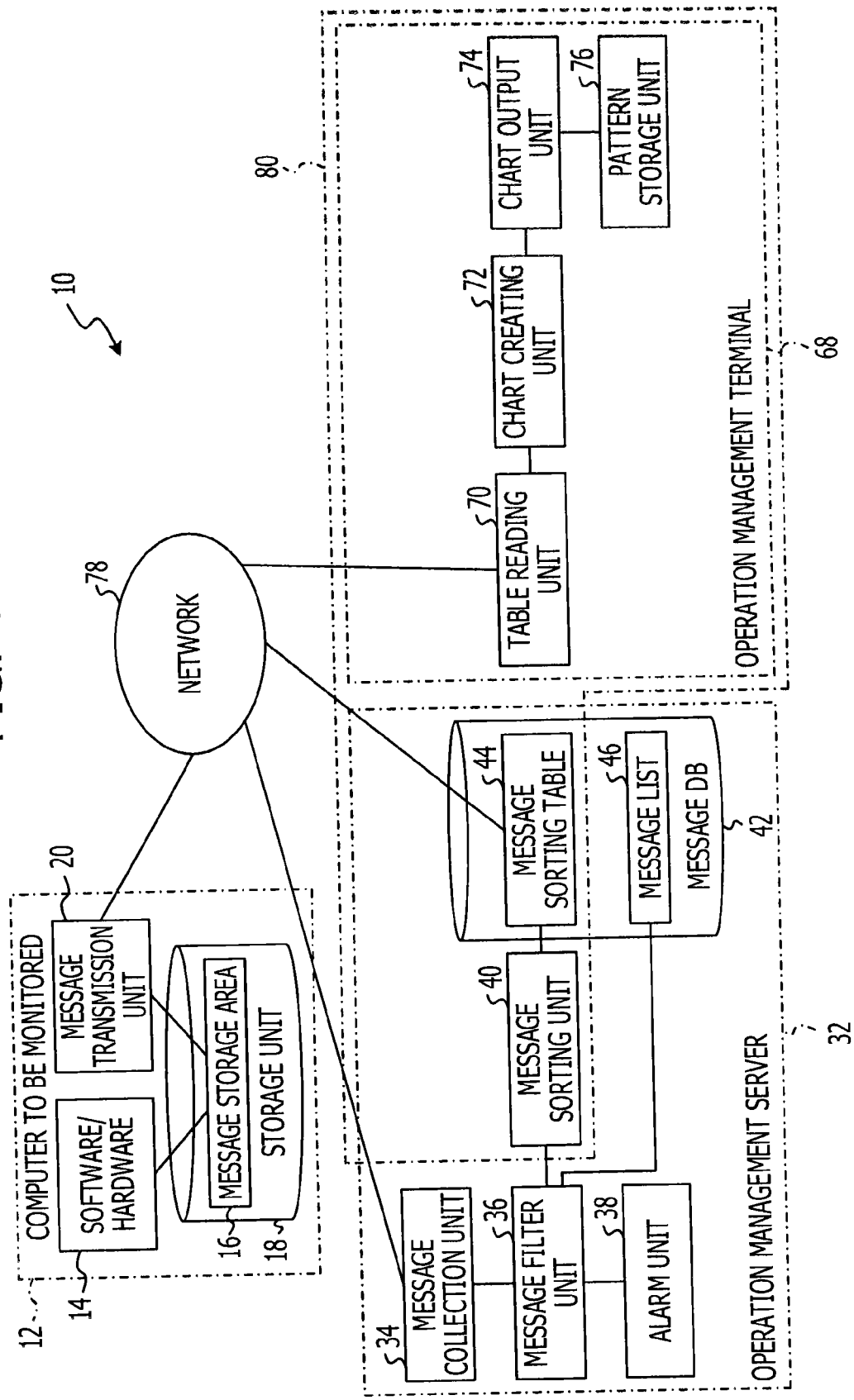
FIG. 1 is a functional block diagram of a computer system described in an embodiment.

Hereinafter, an example of an embodiment of a disclosed technique will be described in detail with reference to the drawings. FIG. 1 illustrates a computer system 10 according to the embodiment. The computer system 10 includes a computer to be monitored 12, an operation management server 32, and an operation management terminal 68. Each of the computer to be monitored 12, the operation management server 32, and the operation management terminal 68 is coupled to a network 78. The computer to be monitored 12 is an example of a computer of the disclosed technique.

The computer to be monitored 12 includes a message generation unit 14, a storage unit 18 provided with a message storage area 16, and a message transmission unit 20. The message generation unit 14 executes a process for generating a message (an example of notification information) to notify a changed state of the computer to be monitored 12 and writing the message to the message storage area 16 in the storage unit 18 every time the state of the computer to be monitored 12 changes.

The message generation unit 14 includes at least one of a program of an operating system or an application program running on the computer to be monitored 12 and hardware of the computer to be monitored 12. The message written to the message storage unit 16 by the message generation unit 14 is information in which time information representing generation time of the message is added to a text representing content of the message.

The message transmission unit 20 periodically refers to the message storage area 16 in the storage unit 18 and determines whether or not a new message is written to the message storage area 16 by the message generation unit 14. When a new message is written to the message storage area 16, the message transmission unit 20 reads the new message from the message storage area 16 and transmits the new message to the operation management server 32.

The operation management server 32 includes a message collection unit 34, a message filter unit 36, an alarm unit 38, a message sorting unit 40, and a message database (DB) 42. The message collection unit 34 collects a message outputted from the computer to be monitored 12 by receiving the message transmitted from the message transmission unit 20 of the computer to be monitored 12.

The message DB 42 includes a message sorting table 44 and a message list 46. In the message list 46, a plurality of types of message templates that are assumed to be outputted from the running computer to be monitored 12 are registered in advance.

The message filter unit 36 determines whether or not the message collected by the message collection unit 34 is a message corresponding to any one of the plurality of types of message templates by comparing the message with the message templates registered in the message list 46. When the message collected by the message collection unit 34 does not correspond to any one of the plurality of types of message templates registered in the message list 46, the message filter unit 36 notifies the alarm unit 38 that a problem message is outputted.

When the alarm unit 38 is notified by the message filter unit 36 that a problem message is outputted, the alarm unit 38 executes a process to output an alarm. Examples of the process to output an alarm include a process to call an operator by causing a buzzer to sound, a process to send an email for notifying that the problem message is outputted, and a process to display an alarm message or the like on a screen of a display.

The message filter unit 36 outputs a message which is a message collected by the message collection unit 34 and which corresponds to any one of the plurality of types of message templates registered in the message list 46 to the message sorting unit 40. When a message is inputted to the message sorting unit 40 from the message filter unit 36, the message sorting unit 40 adds a message ID indicating that the message corresponds to which one of the plurality of types of message templates to the inputted message. The message sorting unit 40 registers the added message ID in the message sorting table 44 in the message DB 42 in association with generation time of the inputted message.

The operation management terminal 68 includes a table reading unit 70, a chart creating unit 72, a chart output unit 74, and a pattern storage unit 76. When the table reading unit 70 is instructed to output a message generation history chart (described later in detail), the table reading unit 70 reads information of a message generated on a specific date from information registered in the message sorting table 44 (generation time and message ID of each message).

The chart creating unit 72 creates a message generation history chart on the basis of the information read from the message sorting table 44 by the table reading unit 70. The chart creating unit 72 creates the message generation history chart by depicting a graphic corresponding to each message at a position corresponding to generation time and message ID of each message on a coordinate space in which the horizontal axis represents the generation time of the message and the vertical axis represents the message ID.

The chart output unit 74 outputs the message generation history chart created by the chart creating unit 72. In the embodiment, as an output form of the message generation history chart, a form where the message generation history chart is displayed on a display is described. However, the message generation history chart may be printed on recording paper.

The pattern storage unit 76 stores a plurality of arrangement patterns of graphics on the message generation history chart which were created by the chart creating unit 72 when a certain problem occurred in the computer to be monitored 12 or a computer of the same type of the computer to be monitored 12 in the past. The chart output unit 74 determines whether or not there is an arrangement pattern similar to an arrangement pattern of the graphic on the message generation history chart created and outputted by the chart creating unit 72 in the plurality of arrangement patterns stored in the pattern storage unit 76. When there is an arrangement pattern similar to the arrangement pattern of the graphic on the message generation history chart, the chart output unit 74 outputs the similar arrangement pattern along with the message generation history chart.

When a specific graphic depicted on the message generation history chart outputted by the chart output unit 74 is selected, the chart creating unit 72 changes a chart to be outputted to the chart output unit 74 to a chart in which some graphics corresponding to the specific graphic are highlighted. When the table reading unit 70 is instructed to change the date of the message generation history chart to be outputted, the table reading unit 70 reads information of messages generated on the changed date from the message sorting table 44. The chart creating unit 72 creates a message generation history chart of the changed date on the basis of the information read by the table reading unit 70. The chart output unit 74 outputs the message generation history chart created by the chart creating unit 72.

A functional unit 80 which includes the message sorting unit 40, the message sorting table 44 in the message DB 42, the table reading unit 70, the chart creating unit 72, the chart output unit 74, and the pattern storage unit 76 is an example of an information output device according to the disclosed technique. The message sorting unit 40 is an example of a determination unit of the disclosed technique. The chart creating unit 72 is an example of a creating unit of the disclosed technique. The chart output unit 74 is an example of an output unit of the disclosed technique. The pattern storage unit 76 is an example of a storage unit of the disclosed technique.

Figure 2:
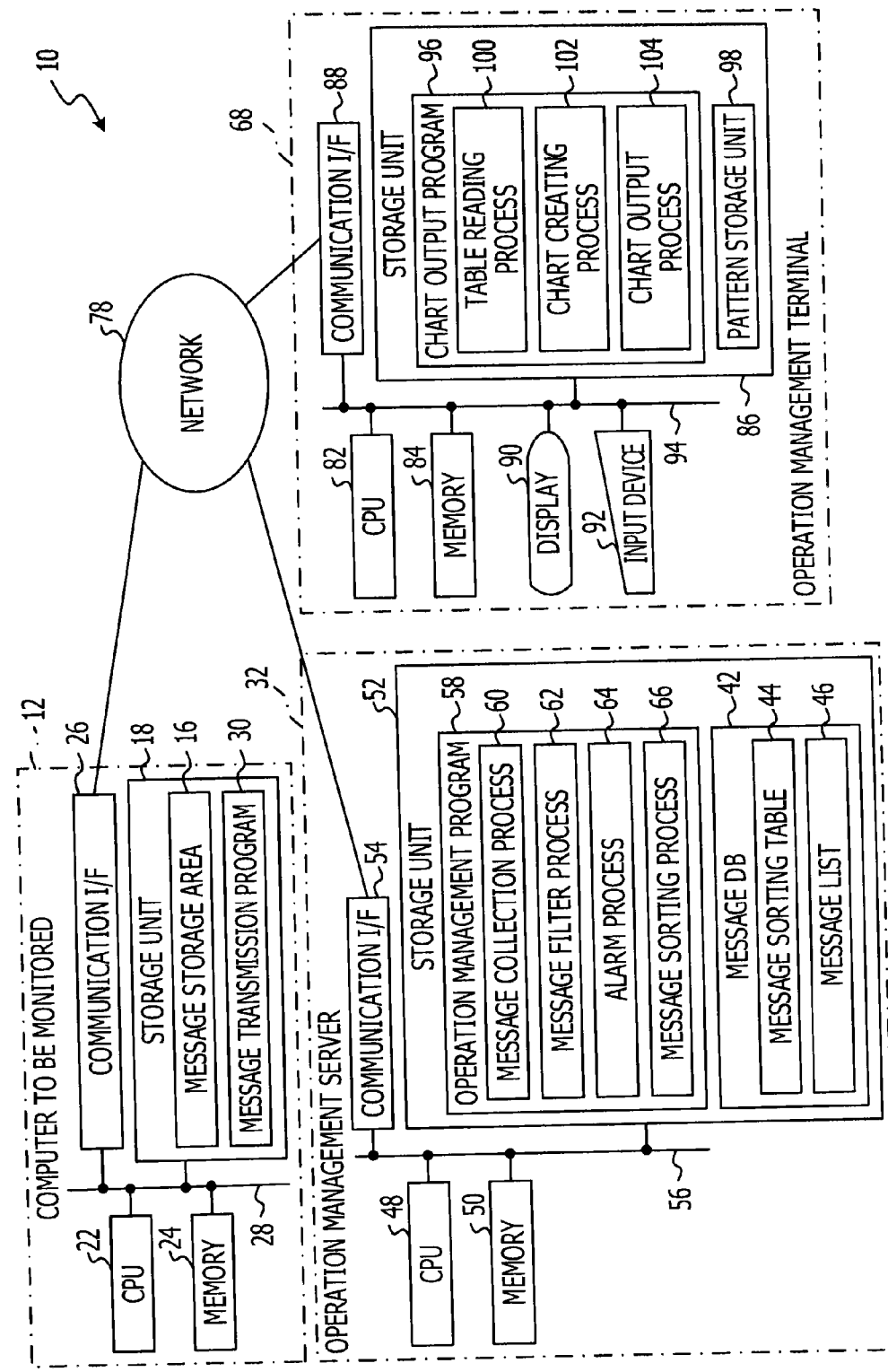
FIG. 2 is a block diagram illustrating a schematic configuration of the computer system.

FIG. 2 is a block diagram illustrating a schematic configuration of the computer system. As illustrated in FIG. 2, the computer to be monitored 12 includes a CPU 22, a memory 24, a non-volatile storage unit 18, and a communication interface (I/F) unit 26. The CPU 22, the memory 24, the storage unit 18, and the communication I/F unit 26 are coupled to each other through a bus 28. The storage unit 18 is provided with a message storage area 16. The storage unit 18 stores a program of an operating system or an application program (not illustrated in FIG. 2) and further stores a message transmission program 30. The CPU 22 of the computer to be monitored 12 operates as the message transmission unit 20 illustrated in FIG. 1 by executing the message transmission program 30.

The operation management server 32 includes a CPU 48, a memory 50, a non-volatile storage unit 52, and a communication I/F unit 54. The CPU 48, the memory 50, the storage unit 52, and the communication I/F unit 54 are coupled to each other through a bus 56. The storage unit 52 stores a program of an operating system or an application program (not illustrated in FIG. 2) and an operation management program 58 and further stores the message DB 42.

The operation management program 58 includes a message collection process 60, a message filter process 62, an alarm process 64, and a message sorting process 66. The CPU 48 of the operation management server 32 operates as the message collection unit 34 illustrated in FIG. 1 by executing the message collection process 60. The CPU 48 operates as the message filter unit 36 illustrated in FIG. 1 by executing the message filter process 62. The CPU 48 operates as the alarm unit 38 illustrated in FIG. 1 by executing the alarm process 64. The CPU 48 operates as the message sorting unit 40 illustrated in FIG. 1 by executing the message sorting process 66.

The operation management terminal 68 includes a CPU 82, a memory 84, a non-volatile storage unit 86, a communication I/F unit 88, a display 90, and an input device 92. The CPU 82, the memory 84, the storage unit 86, and the communication I/F unit 88, the display 90, and the input device 92 are coupled to each other through a bus 94. The storage unit 86 stores a program of an operating system or an application program (not illustrated in FIG. 2) and a chart output program 96 and further includes a pattern storage area 98 functioning as the pattern storage unit 76 illustrated in FIG. 1.

The chart output program 96 includes a table reading process 100, a chart creating process 102, and a chart output process 104. The CPU 82 of the operation management terminal 68 operates as the table reading unit 70 illustrated in FIG. 1 by executing the table reading process 100. The CPU 82 operates as the chart creating unit 72 illustrated in FIG. 1 by executing the chart creating process 102. The CPU 82 operates as the chart output unit 74 illustrated in FIG. 1 by executing the chart output process 104. The chart output program is an example of an information output program according to the disclosed technique, along with the message sorting process 66 of the operation management program 58.

Next, action and effect of the embodiment will be described. In the computer system 10 according to the embodiment, when a problem occurs in the computer to be monitored 12 and an unexpected message is outputted, the alarm unit 38 executes a process to output an alarm. Thereby, a fact that a problem occurs in the computer to be monitored 12 is recognized by a user in an early stage. Examples of the problem that occurs in the computer to be monitored 12 include a system slow down and a security attack (an access for trying to illegally break into the system).

However, the timing when the alarm is outputted by the alarm unit 38 is after the problem occurs in the computer to be monitored 12. For a user, it is desirable to detect a sign of a problem that will occur in the computer to be monitored 12 and keep the problem away from occurring before the problem occurs. It is possible to detect a sign of a problem that will occur in the computer to be monitored 12 by, for example, detecting the throughput, the processing time, the number of accesses, the usage rate of the CPU or the memory, and the like at short intervals and evaluating a tendency of changes of detected parameters. However, in this case, a mechanism may be constructed in which parameters of the throughput, the processing time, and the like are detected, statistically processed, and evaluated. Further, the process is complicated.

On the other hand, a message outputted from the computer to be monitored 12 can be a clue as a sign of a problem that will occur in the computer to be monitored 12. However, regarding the message outputted from the computer to be monitored 12, a sign of a problem that will occur in the computer to be monitored 12 often appears as an increase of output frequency of the message from the computer to be monitored 12. When the messages are outputted from the computer to be monitored 12 at a high frequency, it is difficult to manually detect a sign of occurrence of a problem and find out the cause of the problem from the messages outputted from the computer to be monitored 12. In other words, the operation to manually detect a sign of occurrence of a problem and find out the cause of the problem from the messages outputted from the computer to be monitored 12 takes a time and the operation is desired to be performed by a person who is well versed in the computer system 10 and has high level experience to determine a sign of occurrence of a problem.

In view of the above situation, in the embodiment, the message generation history chart is created in which each message outputted from the computer to be monitored 12 is visually represented as a graphic at a position corresponding to the generation time for each message ID, and the message generation history chart is displayed on the display 90. In the embodiment, the detection of a sign of occurrence of a problem in the computer to be monitored 12 is supported by causing the display 90 to display the message generation history chart.

Hereinafter, the details of the process executed in the computer system 10 will be described. FIG. 3 is a flowchart illustrating an example of a message transmission process executed in the computer to be monitored. In the computer to be monitored 12, the message transmission process illustrated in FIG. 3 is repeatedly executed at regular time intervals by the message transmission unit 20.

In S120 in the message transmission process, the message transmission unit 20 refers to the message storage area 16 provided in the storage unit 18. Every time the state of the computer to be monitored 12 changes, the message generation unit 14 generates a message to notify a changed state of the computer to be monitored 12 and writes the message to the message storage area 16 in the storage unit 18.

FIG. 4 is a diagram illustrating an example of the messages outputted from the computer to be monitored. The messages illustrated in FIG. 4 are written to the message storage area 16. In FIG. 4, a plurality of messages are illustrated in each line. In each message, time information representing the generation time of the message is added to a text representing content of the message. In the next S122, the message transmission unit 20 determines whether or not there is a message that is not transmitted to the operation management server 32 in the messages written to the message storage area 16. When the determination in S122 is NO, the message transmission unit 20 completes the message transmission process.

On the other hand, when there is a message that is not transmitted to the operation management server 32 in the messages written to the message storage area 16, the determination in S122 is YES, so that the message transmission unit 20 proceeds to S124. In S124, the message transmission unit 20 reads all messages that are not transmitted to the operation management server 32 from the message storage area 16 in the storage unit 18. In S126, the message transmission unit 20 transmits the messages read from the message storage area 16 to the operation management server 32 and completes the message transmission process.

As described above, the message transmission process is repeatedly executed at regular time intervals, so that the transmission of the message from the message transmission unit 20 in the computer to be monitored 12 to the operation management server 32 is periodically executed.

Next, a message classification process which is executed in the operation management server 32 every time the operation management server 32 receives a message from the computer to be monitored 12 will be described with reference to FIG. 5. FIG. 5 is a flowchart illustrating an example of the message classification process executed in the operation management server. In S130 in the message classification process, the message collection unit 34 receives all messages transmitted from the computer to be monitored 12 and stores the received messages in the memory 50.

In the next S132, the message filter unit 36 extracts a single message as a message to be processed from the messages received and stored in the memory 50 by the message collection unit 34. In S134, the message filter unit 36 compares the extracted message with each of the plurality of types of message templates registered in the message list 46. In the message list 46, the plurality of types of message templates that are assumed to be outputted from the running computer to be monitored 12 are registered in advance. FIG. 6A illustrates an example of the plurality of types of message templates registered in the message list 46 in advance. "% s" in the message templates illustrated in FIG. 6A represent an arbitrary character string.

In S136, the message filter unit 36 determines whether or not a template corresponding to the message to be processed is registered in the message list 46 on the basis of a result of the comparison in S134. When the determination in S136 is NO, it is possible to determine that the message to be processed is a message that is not assumed to be outputted from the running computer to be monitored 12. Therefore, when the determination in S136 is NO, the process proceeds to S138. In S138, the alarm unit 38 executes a process to notify that a problem message is generated and then the process proceeds to S144.

On the other hand, when the determination in S136 is YES, the message to be processed is a message that is assumed to be outputted from the running computer to be monitored 12, so that the process proceeds to S140. In S140, the message sorting unit 40 determines a message ID registered in the message list 46 in association with the message template corresponding to the message to be processed as a message ID of the message to be processed. In the next S142, the message sorting unit 40 registers the generation date and time and the message ID of the message to be processed in the message sorting table 44.

In S144, the message filter unit 36 determines whether or not there is a message that is not extracted as a message to be processed in the messages received and stored in the memory 50 by the message collection unit 34. When the determination in S144 is YES, the process returns to S132 and the processes from S132 to S144 are repeated until NO is determined in S144. When the determination of S144 is NO, the message classification process is completed. By the message classification process described above, in the message sorting table 44, for example, as illustrated in FIG. 6B, the generation date and time and the message ID are registered for each message except for the problem message outputted from the computer to be monitored 12.

Figure 7:
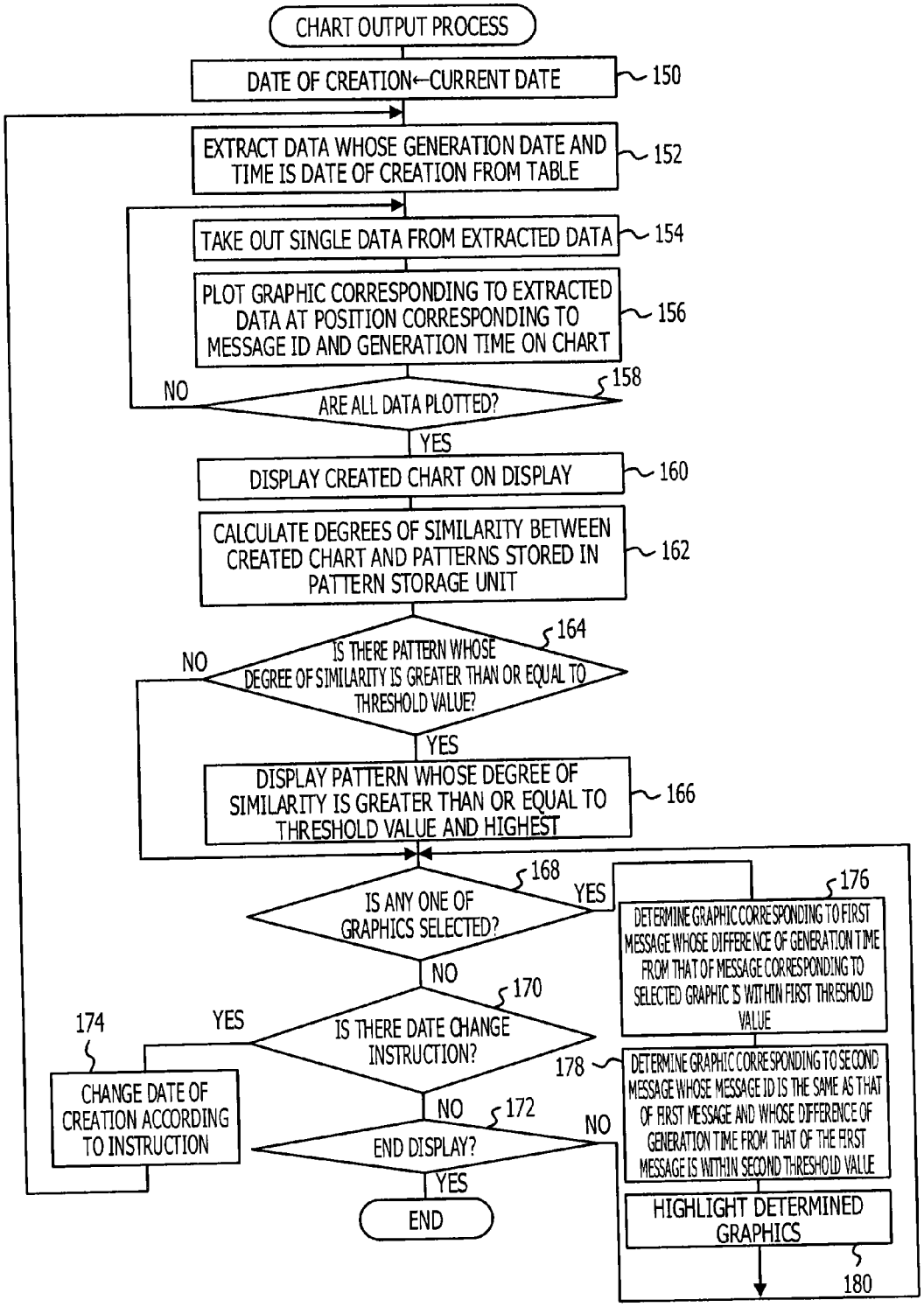
FIG. 7 is a flowchart illustrating an example of a chart output process executed in an operation management terminal.

Next, a chart output process which is executed in the operation management terminal 68 when the operation management terminal 68 is instructed to output the message generation history chart will be described with reference to FIG. 7. FIG. 7 is a flowchart illustrating an example of the chart output process executed in the operation management terminal. In S150 in the chart output process, the table reading unit 70 sets the current date as a date of creation of the message generation history chart.

In the next S152, the table reading unit 70 requests the operation management server 32 to transmit data which is registered in the message sorting table 44 and whose generation date and time is the date of creation of the message generation history chart. Thereby, the operation management server 32 extracts data whose generation date and time is the date of creation of the message generation history chart from the message sorting table 44 and transmits the extracted data to the operation management terminal 68. The table reading unit 70 receives the data transmitted from the operation management server 32 and stores the data in the memory 84.

Figure 8:
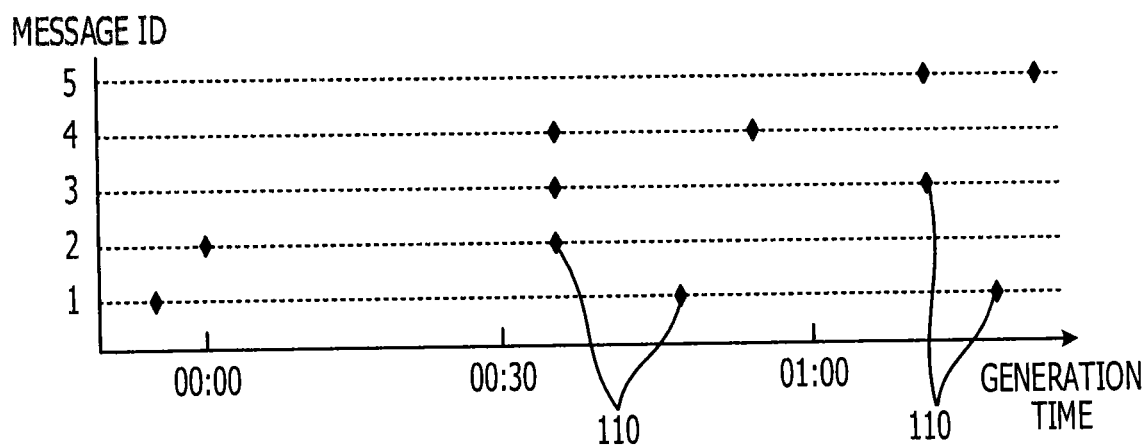
FIG. 8 is a diagram illustrating an example of a message generation history chart displayed on a display of the operation management terminal.

In the next S154, the chart creating unit 72 extracts a single data corresponding to a single message as data be processed from the data which the table reading unit 70 receives from the operation management server 32 and stores in the memory 84. In S156, the chart creating unit 72 plots a diamond-shaped graphic 110 representing the extracted data be processed at a position corresponding to the message ID and the generation time of the message included in the data to be processed on the message generation history chart. FIG. 8 is a diagram illustrating an example of the message generation history chart displayed on the display of the operation management terminal. As illustrated in FIG. 8, the message generation history chart is a chart in which the horizontal axis (an example of a first coordinate axis in the disclosed technique) represents the generation time of the message and the vertical axis (an example of a second coordinate axis in the disclosed technique) represents the message ID. Therefore, the chart creating unit 72 depicts the graphic 110 representing the data be processed at a point whose position along the horizontal axis corresponds to a position of the generation time of the message included in the data to be processed and whose position along the vertical axis corresponds to a position of the message ID included in the data to be processed.

In the next S158, the chart creating unit 72 determines whether or not all data which the table reading unit 70 receives from the operation management server 32 and stores in the memory 84 are plotted on the message generation history chart as the graphic 110. When the determination in S158 is NO, the process returns to S154 and the processes from S154 to S158 are repeated until YES is determined in S158. Thereby, all the data which the table reading unit 70 receives from the operation management server 32 and stores in the memory 84 are plotted on the message generation history chart as the graphic 110. As a result, for example, the message generation history chart as illustrated in FIG. 8 is created.

When the creation of the message generation history chart is completed, YES is determined in S158 and the process proceeds to S160. In S160, the chart output unit 74 causes the display 90 to display the message generation history chart created by the chart creating unit 72.

A user can easily visually understand the state, specifically the tendency of the throughput and the processing time and the like, of the computer to be monitored 12 by referring to the message generation history chart displayed on the display 90. Specifically, for example, regarding a WEB server log switching message illustrated in FIG. 6A as the message ID=1, when the throughput of the computer to be monitored 12 increases, the number of messages outputted per unit time increases. In the message generation history chart, the increase of the number of messages outputted per unit time appears as a decrease of distance between the corresponding graphics 110 (appears as an increase of density). Therefore, the user can intuitively understand the throughput of the computer to be monitored 12.

Regarding start/end messages illustrated in FIG. 6A as the message ID=2 to 5, when the processing time increases, the time interval between outputted messages increases. In the message generation history chart, the increase of the time interval between outputted messages appears as an increase of distance between the corresponding graphics 110 (appears as a decrease of density). Therefore, the user can intuitively understand the length of the processing time in the computer to be monitored 12. The user can detect a sign of occurrence of a problem in the computer to be monitored 12 from the tendency of the throughput and the processing time of the computer to be monitored 12 which the user understands by referring to the message generation history chart.

In the next S162, the chart output unit 74 uses an arrangement pattern of graphics 110 on the created message generation history chart as a template. The chart output unit 74 calculates degrees of similarity between the template and each of a plurality of arrangement patterns of graphics 110 stored in the pattern storage unit 76. As the calculation of the degree of similarity between the template and the arrangement pattern of graphics 110, for example, a process can be applied in which a template matching is executed, a position at which an evaluation value such as a cross-correlation coefficient is the maximum is obtained, and the maximum value of the evaluation value at the obtained position is used as the degree of similarity without change.

In S164, the chart output unit 74 determines whether or not there is an arrangement pattern of graphics 110 whose degree of similarity is greater than or equal to a predetermined threshold value in the plurality of arrangement patterns of graphics 110 stored in the pattern storage unit 76 in the calculation of the degree of similarity in S162. When the determination in S164 is NO, the process proceeds to S168. On the other hand, when the determination in S164 is YES, the process proceeds to S166.

The arrangement patterns of graphics 110 stored in the pattern storage unit 76 are arrangement patterns of graphics 110 on the message generation history chart when a certain problem occurred in the computer to be monitored 12 or a computer of the same type of the computer to be monitored 12 in the past. Therefore, when there is an arrangement pattern of graphics 110 whose calculated degree of similarity is greater than or equal to the threshold value in the arrangement patterns of graphics 110 stored in the pattern storage unit 76, there is a possibility that the same type of problem occurs in the computer to be monitored 12.

Figure 11:
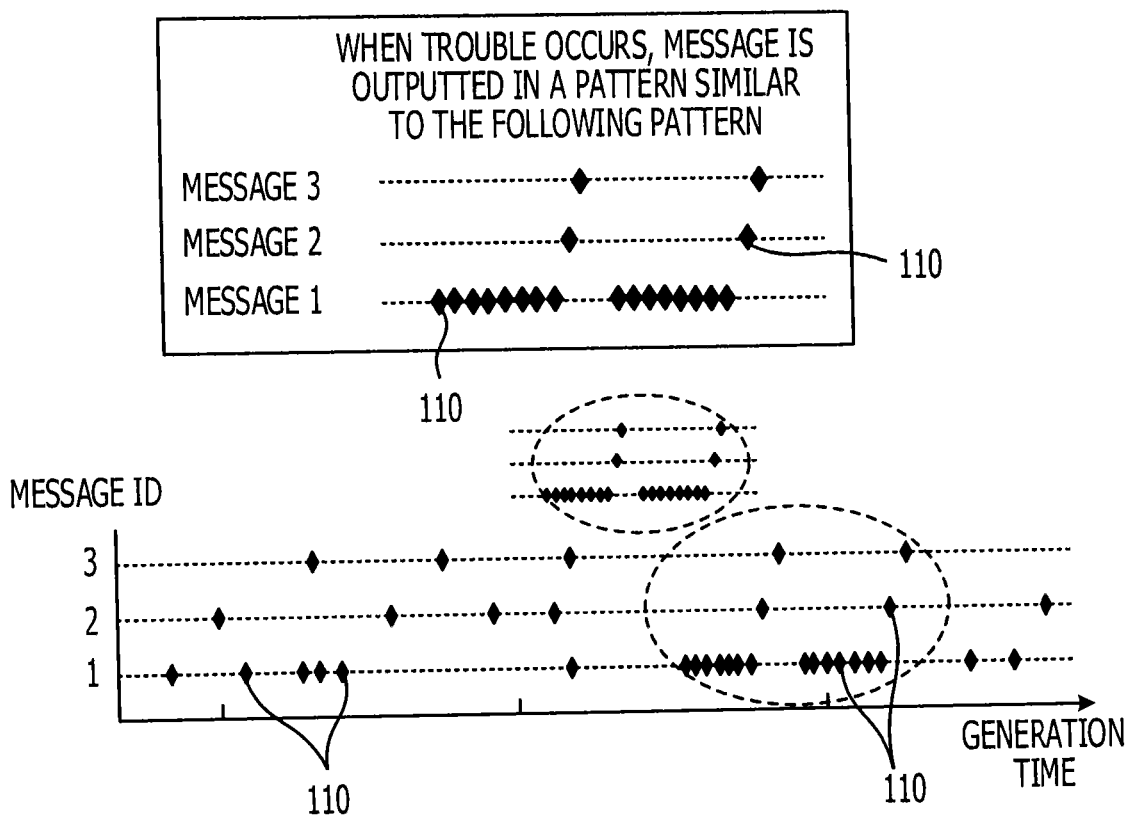
FIG. 11 is a diagram illustrating an example of the message generation history chart displayed on the display of the operation management terminal.

Therefore, in S166, for example, as illustrated in FIG. 11, the chart output unit 74 causes the display 90 to display the arrangement pattern of graphics 110 whose degree of similarity is greater than or equal to the threshold value on a display screen at a position adjacent to the message generation history chart that has already been displayed. When there is a plurality of arrangement patterns of graphics 110 whose degree of similarity is greater than or equal to the threshold value, the chart output unit 74 causes the display 90 to display the arrangement pattern of graphics 110 whose degree of similarity is the highest. As illustrated in FIG. 11, the chart output unit 74 also causes the display 90 to display a message to notify that the displayed arrangement pattern of graphics 110 is a pattern outputted when a problem occurs.

Although the arrangement patterns of graphics 110 stored in the pattern storage unit 76 are effective to detect a sign of occurrence of a problem, conventionally, for example, a vague expression such as "Message x is repeatedly outputted" or "Message y, message z, or the like is outputted" is described in a manual or the like. On the other hand, it is possible to easily visually understand how much the arrangement pattern of graphics 110 is similar by displaying the arrangement patterns of graphics 110 whose degree of similarity to the arrangement pattern of graphics 110 on the message generation history chart is greater than or equal to the threshold value at a position adjacent to the message generation history chart. Thereby, the vagueness due to representing the arrangement patterns of graphics 110 on the message generation history chart when a certain problem occurred in the past by a text is removed, so that it is possible to accurately detect a sign of occurrence of a problem in the computer to be monitored 12.

In S168, the chart creating unit 72 determines whether or not any one of the graphics 110 on the message generation history chart displayed on the display 90 is selected by the user. When the determination in S168 is NO, the process proceeds to S170. In S170, the table reading unit 70 determines whether or not change of the date of creation of the message generation history chart is instructed by the user. When the determination in S170 is also NO, the process proceeds to S172. In S172, the chart output unit 74 determines whether or not the end of display of the message generation history chart is instructed by the user. When the determination in S172 is NO, the process returns to S168 and the processes from S168 to S172 are repeated until YES is determined in S168 or S170 or YES is determined in S172.

Here, an operation to select any one of the graphics 110 on the message generation history chart displayed on the display 90 is performed by the user, YES is determined in S168 and the process proceeds to S176. In S176, the chart creating unit 72 determines a graphic 110 corresponding to a first message whose difference of generation time from that of the message corresponding to the graphic 110 selected by the user is within a predetermined first threshold value from the graphics 110 on the message generation history chart. In the next S178, the chart creating unit 72 determines a graphic 110 corresponding to a second message whose message ID is the same as that of the first message and whose difference of generation time from that of the first message is within a predetermined second threshold value.

The second threshold value is greater than the first threshold value. It is possible to determine the graphic 110 corresponding to the first message and the graphic 110 corresponding to the second message by referring to the data stored in the memory 84 by the table reading unit 70. In S180, the chart creating unit 72 creates a new message generation history chart in which the graphics 110 determined in S176 and S178 are highlighted with respect to the message generation history chart displayed on the display 90. The highlighted display of the graphic 110 can be realized by, for example, changing display color of the graphic 110, increasing display brightness of the graphic 110, blinking display of the graphic 110, or the like. The created new message generation history chart is displayed on the display 90 by the chart output unit 74.

Figure 9:
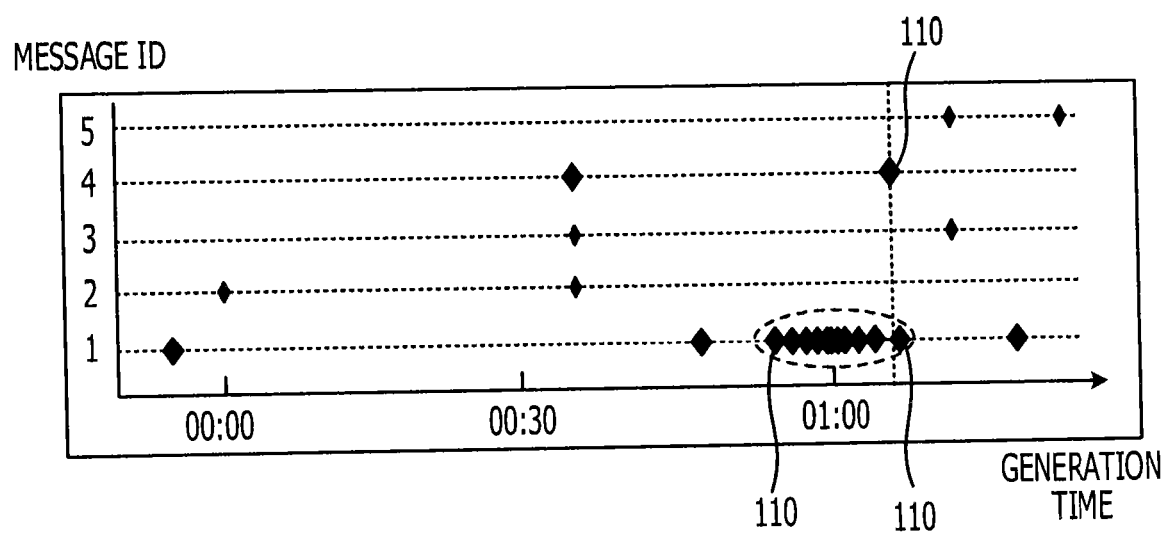
FIG. 9 is a diagram illustrating an example of the message generation history chart displayed on the display of the operation management terminal.

FIG. 9 is an example of the message generation history chart In which the graphic 110 corresponding to the first message and the graphic 110 corresponding to the second message are highlighted. In FIG. 9, the graphic 110 whose message ID is 4 and which is located on a dotted line is the graphic 110 selected by the user. In FIG. 9, among the graphics 110 whose message ID is 1 and which are enclosed by a dashed line, the graphic 110 located closest to the dotted line is the graphic 110 corresponding to the first message and the remaining graphics 110 are the graphics 110 corresponding to the second message.

In this way, when any one of the graphics 110 on the message generation history chart is selected, a graphic 110 corresponding to the first message whose difference of generation time from that of the message corresponding to the selected graphic 110 is within the first threshold value is highlighted on the message generation history chart. The graphic 110 corresponding to the second message whose message ID is the same as that of the first message and whose difference of generation time from that of the first message is within the second threshold value is also highlighted on the message generation history chart.

Therefore, for example, when the user detects that a certain abnormality occurs in the computer to be monitored 12, if the user selects the graphic 110 corresponding to the message related to the detected abnormality, the user can recognize messages outputted immediately before or immediately after the message related to the abnormality. Thereby, when a certain abnormality is generated in the computer to be monitored 12, the user can determine a relationship between the message related to the generated abnormality and other messages, so that the user can quickly find out the cause of the abnormality.

When the change of the date of creation of the message generation history chart is instructed by the user, YES is determined in S170 and the process proceeds to S174. In S174, the table reading unit 70 changes the date of creation of the message generation history chart according to the instruction from the user and the process returns to S152. In this case, in S152 to S160, the message generation history chart whose date of creation is the changed date of creation is re-created and displayed on the display 90.

Figure 10A:
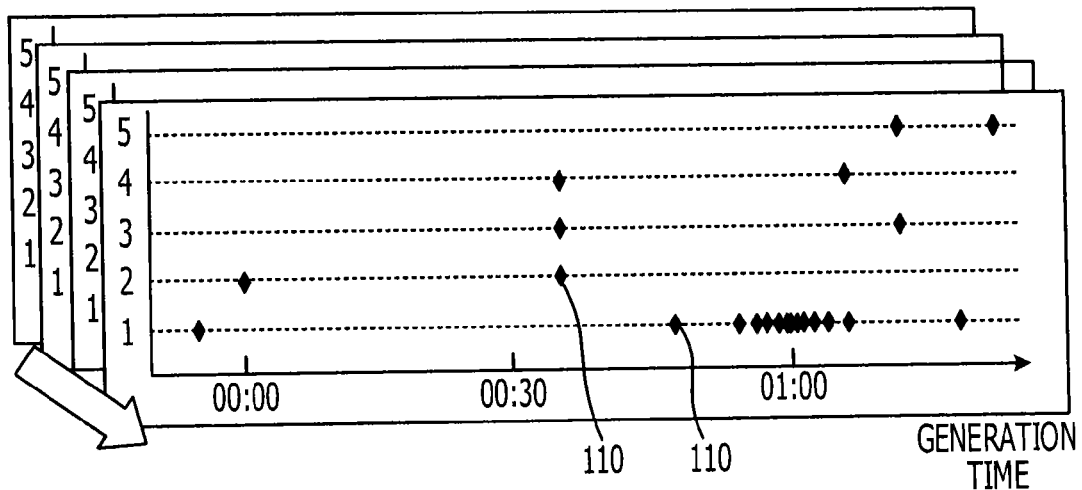
FIGS. 10A and 10B are diagrams illustrating an example of the message generation history chart displayed on the display of the operation management terminal.
Figure 10B:
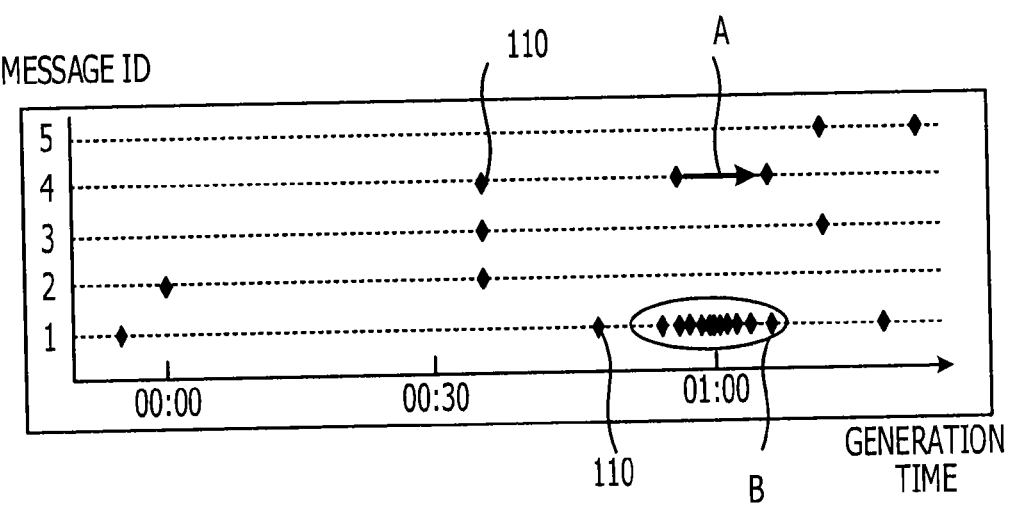

In this way, every time the user instructs a change of the date of creation of the message generation history chart, the message generation history chart whose date of creation is the changed date of creation is re-created and displayed on the display 90. FIGS. 10A and 10B are diagrams illustrating an example of the message generation history chart displayed on the display of the operation management terminal. When the user performs an operation to sequentially change the date of creation, as illustrated in FIG. 10A, the message generation history charts whose dates of creation are different from each other are sequentially displayed like an animation. Therefore, the user can easily visually recognize how the throughput and the processing time of the computer to be monitored 12 change day by day by sequentially referring to the message generation history charts of different dates which are sequentially displayed. Specifically, as illustrated by an arrow A in FIG. 10B, the user can recognize how the timing when a specific message is outputted or the time interval between an outputted pair of messages changes. Also, for example, the user can recognize how the time intervals between the outputted messages (degree of density on the chart) illustrated by being enclosed by a graphic B in FIG. 10B changes.

When the end of display of the message generation history chart is instructed by the user, YES is determined in S172 and the chart output process is completed.

In this way, in the embodiment, it is possible to detect a sign of occurrence of a problem in the computer to be monitored 12 by a simple process in which the message generation history chart is generated by plotting each message outputted from the computer to be monitored 12 as the graphic 110.

In the above description, the diamond-shaped graphic 110 is used as a graphic corresponding to the message outputted from the computer to be monitored 12. However, it is not limited to this and any shape can be used as the shape of the graphic.

In the above description, as an example of the chart in the disclosed technique, a two-dimensional message generation history chart is created in which the horizontal axis represents the generation time of the message and the vertical axis represents the message ID. However, it is not limited to this. For example, a three-dimensional chart in which a third coordinate axis represents the date may be created and outputted.

In the above description, as an example of the output of the message generation history chart, the message generation history chart is displayed on the display 90. However, it is not limited to this. For example, as other examples of the output of the message generation history chart, the message generation history chart may be outputted as a file or the message generation history chart may be printed on paper.

Further, in the above description, among the arrangement patterns of graphics 110 stored in the pattern storage unit 76, the arrangement pattern whose degree of similarity to the arrangement pattern of graphics 110 on the message generation history chart displayed on the display 90 is the highest is displayed on the display 90. However, it is not limited to this and a plurality of arrangement patterns whose degree of similarity is greater than or equal to the threshold value may be displayed.

In the above description, as an example of notification information, a message (text information) is outputted. However, it is not limited to this, and code information or the like indicating the state of the computer to be monitored 12 may be outputted as the notification information.

In the above description, the operation management server 32 and the operation management terminal 68 function as an example of the information output device according to the disclosed technique. However, it is not limited to this. For example, it is possible to cause a single computer to function as an example of the information output device according to the disclosed technique.

Further, in the above description, the chart output program and the operation management program which are an example of the information output program according to the disclosed technique are stored (installed) in the storage unit 86 of the operation management terminal 68 or the storage unit 52 of the operation management server 32 in advance. However, it is not limited to this, and the information output program according to the disclosed technique can be provided by being recorded in a recording medium such as a CD-ROM or a DVD-ROM.

All documents, patent applications, and technical standards described in the present specification are incorporated herein by reference to the same extent as if each document, patent application, and technical standard were specifically and individually indicated to be incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information output device, comprising:
   a first processor configured to execute a process to determine a type of notification information which is outputted from a computer and which notifies a state of the computer; and
   a second processor configured to execute a process to create a chart, in which a first coordinate axis represents time when the notification information is outputted from the computer, a second coordinate axis represents the type of the notification information, and the notification information is drawn at a corresponding position, and output the chart, wherein when specific first notification information drawn in the outputted chart is selected, the second processor executes a process to change the chart to be outputted into a chart in which among the notification information drawn on the chart, second notification information whose difference of the output time from that of the selected first information is within a first threshold value and third notification information whose type is the same as that of the second notification information and whose difference of the output time from that of the second information is within a second threshold value are highlighted.

2. The information output device according to claim 1, wherein
the second processor executes a process to create a plurality of the charts for each unit time period and sequentially output the charts one by one.

3. The information output device according to claim 1, further comprising:
a memory configured to store a drawing pattern of the notification information on the chart when a problem occurs in a computer that outputs the notification information,
wherein the second processor executes a process to output the drawing pattern stored in the memory along with the chart.

4. The information output device according to claim 3, wherein
the second processor executes a process to output the drawing pattern which is stored in the memory and whose degree of similarity to an arrangement pattern of the notification information on the chart created by the creating unit is higher than a threshold value.

5. The information output device according to claim 1, wherein
the notification information includes first notification information that notifies an end of a job and second notification information that notifies a change of log.

6. An information output method that is implemented by an information output device, comprising:
determining a type of notification information which is outputted from a computer and which notifies a state of the computer;
creating a chart in which a first coordinate axis represents time when the notification information is outputted from the computer, a second coordinate axis represents the type of the notification information, and the notification information is drawn at a corresponding position; and
outputting the chart, wherein
when specific first notification information drawn in the outputted chart is selected, the chart to be outputted is changed into a chart in which among the notification information drawn on the chart, second notification information whose difference of the output time from that of the selected first information is within a first threshold value and third notification information whose type is the same as that of the second notification information and whose difference of the output time from that of the second information is within a second threshold value are highlighted.

7. The information output method according to claim 6, wherein
the creating includes executing a process to create a plurality of the charts for each unit time period, and
the outputting includes sequentially outputting the charts one by one.

8. The information output method according to claim 6, wherein
a drawing pattern of the notification information on the chart when a problem occurs in a computer that outputs the notification information is stored and the stored drawing pattern is outputted along with the chart.

9. The information output method according to claim 8, wherein
among the stored drawing pattern, the drawing pattern whose degree of similarity to an arrangement pattern of the notification information on the created chart is higher than a threshold value is outputted.

10. The information output method according to claim 6, wherein
the notification information includes first notification information that notifies an end of a job and second notification information that notifies a change of log.

11. A computer-readable recording medium storing a program causing a computer to execute a procedure, the procedure comprising:
determining a type of notification information which is outputted from a computer and which notifies a state of the computer;
creating a chart in which a first coordinate axis represents time when the notification information is outputted from the computer, a second coordinate axis represents the type of the notification information, and the notification information is drawn at a corresponding position; and
outputting the chart, wherein
when specific first notification information drawn in the outputted chart is selected, the chart to be outputted is changed into a chart in which among the notification information drawn on the chart, second notification information whose difference of the output time from that of the selected first information is within a first threshold value and third notification information whose type is the same as that of the second notification information and whose difference of the output time from that of the second information is within a second threshold value are highlighted.

* * * * *